(12) United States Patent
Sheen et al.

(10) Patent No.: US 9,900,790 B1
(45) Date of Patent: Feb. 20, 2018

(54) PREDICTION OF PERFORMANCE INDICATORS IN CELLULAR NETWORKS

(71) Applicant: Futurewei Technologies, Inc., Plano, TX (US)

(72) Inventors: Baoling Sheen, Kildeer, IL (US); Ying Li, Hillsborough, NJ (US); Jin Yang, Bridgewater, NJ (US); Ji Wang, Bridgewater, NJ (US); Wenwen Zhao, Davis, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/373,177

(22) Filed: Dec. 8, 2016

(51) Int. Cl.
*H04B 17/00* (2015.01)
*H04W 24/02* (2009.01)
*H04W 24/08* (2009.01)
*G06N 5/04* (2006.01)
*G06N 99/00* (2010.01)

(52) U.S. Cl.
CPC .............. *H04W 24/02* (2013.01); *G06N 5/04* (2013.01); *G06N 99/005* (2013.01); *H04W 24/08* (2013.01)

(58) Field of Classification Search
None
See application file for complete search history.

(56) References Cited

U.S. PATENT DOCUMENTS

| 2010/0332642 | A1* | 12/2010 | Krishnaswamy | H04L 41/14 709/224 |
| 2012/0040664 | A1* | 2/2012 | Kamdar | H04W 16/18 455/425 |
| 2013/0143561 | A1* | 6/2013 | Nuss | H04W 24/02 455/436 |

* cited by examiner

*Primary Examiner* — Mohammed Rachedine
(74) *Attorney, Agent, or Firm* — Vierra Magen Marcus LLP

(57) ABSTRACT

A system and method of predicting cellular network performance based on observed performance indicator data from cells in the cellular network. The method includes accessing a set of observed performance indicator data, the performance indicator data including a time sequenced measure of performance indicators for the cellular network. The method then classifies the observed performance data based on a cell as one of a high load growth cell and a high load non-growth cell. Based on the classification of the cell, the method computes a future value of at least one performance indicator using a predictive model based on testing data for the cell in the observed performance indicator data. The predictive model is derived from training data in the observed performance indicator data. An indication of the future value of the at least one of the performance indicators is output when the future value exceeds an alarm value.

20 Claims, 6 Drawing Sheets

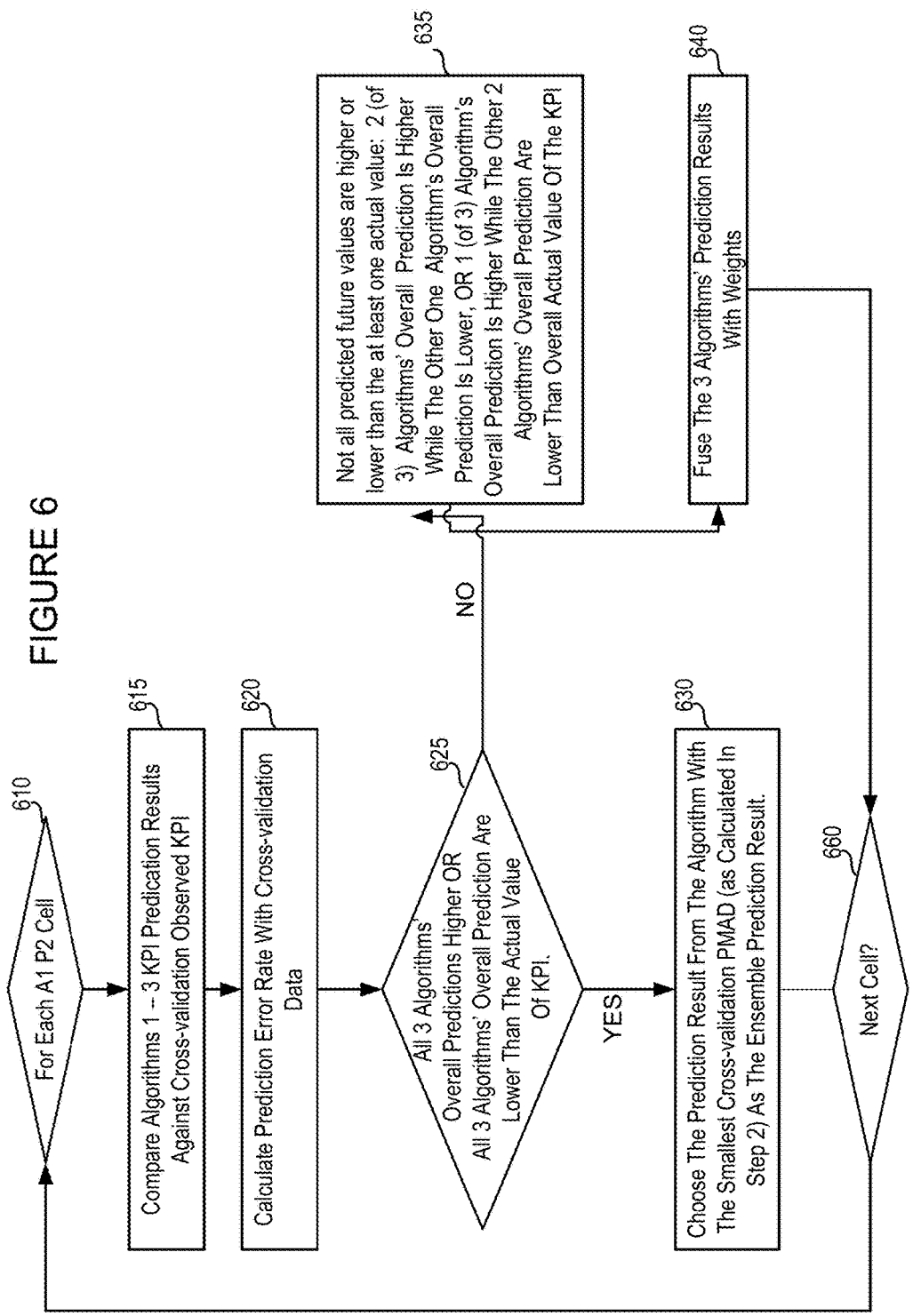

PREDICTION OF PERFORMANCE INDICATORS IN CELLULAR NETWORKS

TECHNICAL FIELD

The disclosure relates to the maintenance of cellular networks by predicting issues with cell performance based on key performance and quality indicators.

BACKGROUND

The performance of a cellular network is affected by a collection of factors such as the data and voice traffic load, the RF coverage, the level of inter-cell interference, the location of users, and hardware failures. In many cases, the performance of a few wireless cells within a cellular network may appear abnormal, and mobile users that are served by these cells will suffer from poor user experience. A poor user experience will give rise to customer dissatisfaction.

Cell network operators often need to detect the abnormal behaviors and then take actions to fix the problems before the situation deteriorates. Operators rely so called Key Performance Indicators (KPIs) and Key Quality Indicators (KQIs) to measure performance of a cellular network. KPI's or KQI's such as access setup success rate, average cell throughput, or average throughput per user device reflect the quality of the network and user experience. These performance indicators are closely monitored by the operators. Operators use these performance indicators to forecast future KPI's when the traffic or number of users in a cell is increasing or before any network changes take place.

A KPI is generally a time series quantification of a particular performance factor indicating the performance of network. Examples include downlink average cell throughput including all user equipment in each cell in a cellular network, downlink average throughput per user equipment in each cell in a cellular network, or total transmitted bits at each cell in a cellular network. Accurate prediction of the KPIs is very important in service provisioning and network planning, such as foreseeing whether the network supported capacity is meeting user equipment demand. If not, network managers can, for example, add new base stations to the network to address potential resource or capacity issues.

SUMMARY

The disclosure includes a processor implemented method predicting cellular network performance based on observed performance indicator data from cells in the cellular network. The method includes accessing a set of observed performance indicator data, the performance indicator data including a time sequenced measure of performance indicators for the cellular network. The method then classifies the observed performance data based on a cell as one of a high load growth cell and a high load non-growth cell. Based on the classification of the cell, the method computes a future value of at least one performance indicator using a predictive model based on testing data for the cell in the observed performance indicator data. The predictive model is derived from training data in the observed performance indicator data. An indication of the future value of the at least one of the performance indicators is output when the future value exceeds an alarm value.

In a further aspect, the set of observed performance indicator data comprises performance indicator data for a time period, and the computing comprises computing an ensemble predictive model combining future values from computing at least two predictive models for the high load growth cells.

In another aspect, the method includes a first predictive model, a second predictive model, and a third predictive model. Each model predicts high load growth cell future values for at least one performance indicator. The first predictive model is based on training data from high load growth cells and computing future values using the ensemble predictive model comprises computing the first predictive model with testing data from high load growth cells. The second predictive model is based on the training data from all high load cells and computing using the ensemble predictive model further comprises computing the second predictive model with the testing data from high load growth cells. The third predictive model is based on training data from all high load non-growth cells and computing using the ensemble predictive model further comprises computing the third predictive model with the testing data from high load growth cells.

In a further aspect, the set of performance indicator data further includes validation data, and the method further comprises determining future values for output by the method by: comparing predicted future values of the at least one performance indicator calculated by each of the first predictive model, the second predictive model and the third predictive model to at least one actual value of the at least one performance indicator in the validation data, and if all predicted future values are higher or lower than the at least one actual value, selecting a predicted future value by the predictive model having the smallest error relative to the validation data; or if not all predicted future values are higher or lower than the at least one actual value, then fusing the predicted future values of each of the first predictive model, the second predictive model and the third predictive model into an ensemble predictive value by weighting an error of each model relative to the at least one actual value of the performance indicator.

Another aspect of the disclosure includes a non-transitory computer-readable medium storing computer instructions that when executed by one or more processors, cause the one or more processors to perform the steps of: accessing a set of observed performance indicator data, the performance indicator data including a time sequenced measure of performance indicators for a cellular network; computing future values of at least one performance indicator using an ensemble predictive model based on testing data for cells classified as high load growth cells in the observed performance indicator data, the ensemble predictive model derived from training data for at least a portion of cells classified as high load cells in the observed performance indicator data and including at least two predictive models for the high load growth cells. The non-transitory computer-readable medium also includes instructions that when executed by one or more processors, cause the one or more processors to output an indication of a future value of the at least one of the performance indicators when the future value exceeds an alarm value. Other embodiments of this aspect include corresponding computer systems, apparatus, and computer programs recorded on one or more computer storage devices, each configured to perform the actions of the methods.

A further aspect includes a cellular network monitoring system. The cellular network monitoring system includes a processing system including at least one processor, storage coupled to the processor, and a network interface. Instructions stored on the storage are operable to instruct the at least one processor to: access a set of observed performance indicator data, the performance indicator data including a time sequenced measure of performance indicators for the cellular network; classify the observed performance data based on a cell from which the data originated by including classifying the cell as one of a high load growth cell and a high load non-growth cell; compute future values of at least one performance indicator using at least an ensemble predictive model based on testing data for cells classified as high load growth cells in the observed performance indicator data, the ensemble predictive model derived from training data for at least a portion of cells classified as high load cells in the observed performance indicator data and including at least two predictive models for the high load growth cells where each of the at least two predictive models are based on training data from a different one of high load growth cells, all high load cells and high load non-growth cells; and output an indication of a future value of at least one of the performance indicators when the future value exceeds an alarm value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a flowchart illustrating a step in FIG. 5 of choosing the best prediction model.

DETAILED DESCRIPTION

Figure 1:
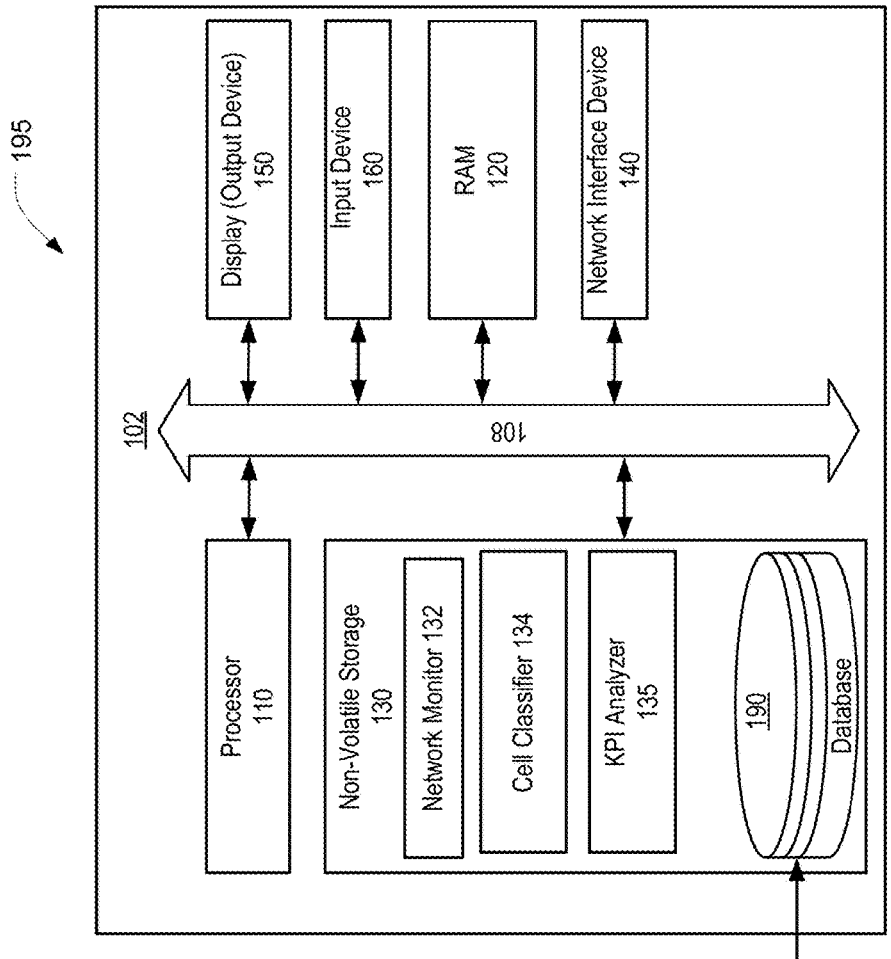
FIG. 1 depicts functional and structural components an exemplary system in which the present system and method may be implemented, including a block diagram of a processing device suitable for implementing the system and method.
Figure 1:
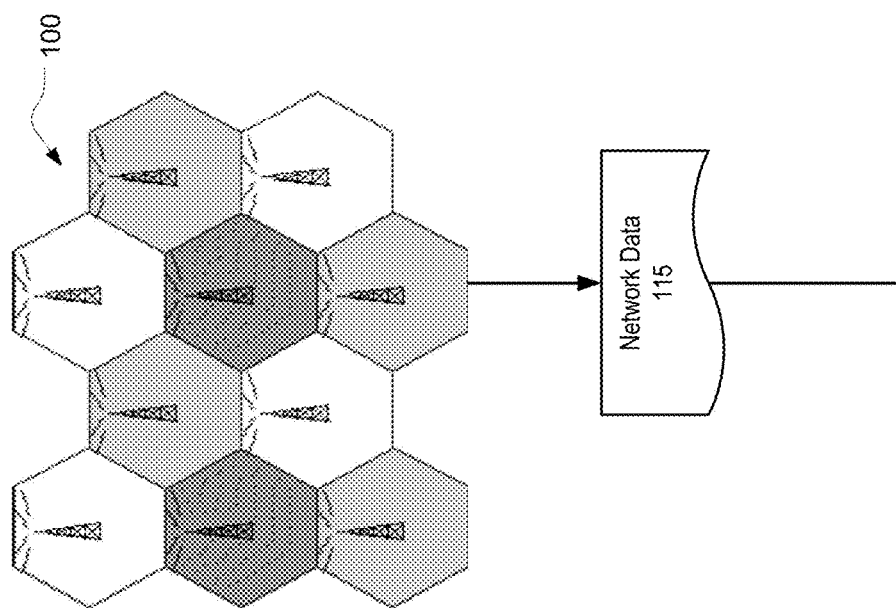

A system and method are disclosed to accurately predict performance indicators cells in a cellular network and provide an alarming or warning output to alert the operator to take precautions before further network performance or user experience degradation occurs. The disclosure, in one aspect, uses multiple approaches and different training data to create predictive models based on cell classifications, and predicts future values of performance indicators utilizing the different approaches to enhance the prediction accuracy. In one approach, multiple predictive models are used to predict future values for the same testing data of one classification of cells. In this ensemble approach, the best predicted future values are selected or the values are fused to integrate the strength of the multiple algorithms altogether to enhance the accuracy of the prediction.

The disclosure discussed herein will be discussed by way of examples with respect to key performance indicators (KPIs). It will be recognized that the techniques herein can be equally applied to prediction of other performance indicators of a cellular network, such as for key quality indicators (KQIs), indicators for quality of services (QoS), and indicators for quality of experiences (QoE).

The disclosure uses multiple approaches and different training data for the cells to create different performance indicator prediction approaches. Observed performance indicator data from the network is used as training, testing and in some cases validation data. Cells in the observed data are classified based on load into medium and high load cells, with the high load cells further classified into growth and non-growth cells. In an ensemble approach, more than one algorithm for the prediction for future predictive indicators is created and the prediction results intelligently selected or fused based on the output of the multiple algorithms.

Accurate prediction of the KPIs is very important to network operators as this allows them to foresee whether the network supported capacity can meet the performance requirements expected by network users and to determine whether any corrective operations need to take place. This disclosure discloses a solution to accurately predict KPIs of the network elements by using multiple prediction methods. Traditionally network performance indicators (KPI/KQI) are estimated based on engineering experience per trend analysis, e.g. predicting the KPI values like the average values from the historical data, or with certain defined delta. This is time consuming and usually not portable to other markets with different traffic models or scenarios Using multiple approaches under different conditions for the cells can improve the prediction accuracy for each individual condition relative to the traditional prediction approach which uses single approach to predict KPI for all cell conditions. Ensemble learning utilizes the strength of the multiple algorithms altogether to improve the accuracy of the prediction relative to the single algorithm approach.

FIG. 1 depicts functional and structural components of an embodiment of a network monitoring system 195 which performs network analysis. FIG. 1 includes a network 100 which is the subject network to be monitored using the system. Although only one network is illustrated, multiple networks may be monitored, each having their own fingerprint database constructed based on such network's historical network data and engineering data.

The network 100 may comprise any wired or wireless network that provides communication connectivity for devices. The network 100 may include various cellular network and packet data network components such as a base transceiver station (BTS), a node-B, an evolved node-B (eNodeB), a base station controller (BSC), a radio network controller (RNC), a service GPRS support node (SGSN), a gateway GPRS support node (GGSN), a WAP gateway, mobile switching center (MSC), short message service centers (SMSC), a home location registers (HLR), a visitor location registers (VLR), an Internet protocol multimedia subsystem (IMS), and/or the like. The network 100 may employ any of the known and available communication protocols, such as Code Division Multiple Access (CDMA), Global System for Mobile communications (GSM), Universal Mobile Telecommunications System (UMTS), Long Term Evolution (LTE), or any other network protocol that facilitates communication between communication network 100 and network enabled devices. The communication network 100 may also be compatible with future mobile communication standards including, but not limited to, LTE-Advanced and WIMAX-Advanced. The network 100 may include other types of devices and nodes for receiving and transmitting voice, data, and combination information to and from radio transceivers, networks, the Internet, and other content delivery networks. The network may support communication from any portable or non-portable communication device having network connectivity function, such as a cellular telephone, a computer, a tablet, and the like, can operatively connect to the communication network 100.

Key Performance Indicators (KPIs) are internal indicators based on time-referenced network counters. Such KPIs are evaluated in the context of other counters and related to KQIs. Each KPI may be a time-referenced measure of the indictor. Variations in each KPI can be tracked to a time indication. Network KPI's may be measured and monitored using defined standard interfaces in the wireless network. These KPIs include multiple network performance counters and timers. For example, in a mobile data service network, the service accessibility may be determined through the Packet Data Protocol (PDP) Context Activation Success Rate KPI, which may be an aggregated ratio of the successful PDP context activations to PDP context attempts. This KPI indicates the ability of the mobile subscriber to access the packet switched service.

Several exemplary KPIs referenced herein include:
PS.Service.Downlink.Average.Throughput—The average downlink service traffic throughput at cell level;
L.Traffic.ActiveUser.DL.QCI.Total—The number of activated user equipment from QCI 1 to QCI 9 in the downlink buffer at cell level;
L.Thrp.bits.DL—The total downlink traffic volume for packet data convergence protocol (PDCP) service data units (SDUs) in a cell; and
L.Thrp.bits.UL—The total uplink traffic volume for PDCP protocol data units (PDUs) in a cell.

As discussed below, these KPIs may be used in the disclosure herein as training, testing or validation data in order to predict future trends for such KPIs in a network analysis that can then alert network administrators to potential issues with one or more cells, allowing the network administrator to address such issues before they affect a user experience.

Returning to FIG. 1, a network monitoring system 195 may include a processing device 102. FIG. 1 shows a block diagram of a processing device 102 suitable for implementing the system and method. The processing device 102 may include, for example, a processor 110, random access memory (RAM) 120, non-volatile storage 130, a display unit (output device) 150, an input device 160, and a network interface device 140. In certain embodiments, the processing device 102 may be embedded into a personal computer, mobile computer, mobile phone, tablet, or other suitable processing device.

Illustrated in non-volatile storage 130 are functional components which may be implemented by instructions operable to cause processor 110 to implement one or more of the processes described below. While illustrated as part of non-volatile storage 130, such instructions may be operable to cause the processor to perform various processes described herein using any one or more of the hardware components illustrated in FIG. 1. These functional components include a network monitor 132, a cell classifier 134, and a KPI analyzer 135. Also shown in non-volatile storage 130 is a database 190 which stores network data 115 gathered from the cellular network 100.

Non-volatile storage 130 may comprise any combination of one or more computer readable media. The computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a computer diskette, a hard disk, a random access memory (RAM), a read-only memory (ROM), an erasable programmable read-only memory (EPROM or Flash memory), an appropriate optical fiber with a repeater, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The processing device 102 can include a set of instructions that can be executed to cause computer system 102 to perform any one or more of the methods or computer based functions disclosed herein. Computer program code for carrying out operations for aspects of the present disclosure may be written in any combination of one or more programming languages, including an object-oriented programming language conventional procedural programming languages. The program code may execute entirely on the computer system 102, partly on the computer system 102, as a stand-alone software package, partly on the computer system 102 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

As illustrated in FIG. 1, the processing system 102 includes a processor 110. A processor 110 for processing device 102 is configured to execute software instructions to perform functions as described in the various embodiments herein. A processor 110 for a processing device 102 may be a general-purpose processor or may be part of an application specific integrated circuit (ASIC). A processor 110 for a processing device 102 may also be a microprocessor, a microcomputer, a processor chip, a controller, a microcontroller, a digital signal processor (DSP), a state machine, or a programmable logic device. A processor 110 for a processing device 102 may also be a logical circuit, including a programmable gate array (PGA) such as a field programmable gate array (FPGA), or another type of circuit that includes discrete gate and/or transistor logic. A processor 110 for a processing device 102 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the processing device 102 includes a RAM 120 and a non-volatile storage 130 that can communicate with each, and processor 110, other via a bus 108.

As shown, the processing device 102 may further include a display unit (output device) 150, such as a liquid crystal display (LCD), an organic light emitting diode (OLED), a flat panel display, a solid state display, or a cathode ray tube (CRT). Additionally, the imaging processor may include an input device 160, such as a keyboard/virtual keyboard or touch-sensitive input screen or speech input with speech recognition, and which may include a cursor control device, such as a mouse or touch-sensitive input screen or pad.

The network monitor 132 is a component which may query or otherwise enable gathering of network data 115 at the command of an administrator or operator of the network monitoring system 195. Information may be gathered periodically, intermittently or whenever a new KPI analysis of a cellular network 100 is desired.

The functions of the cell classifier 134 and KPI analyzer 135 are discussed herein.

Figure 2:
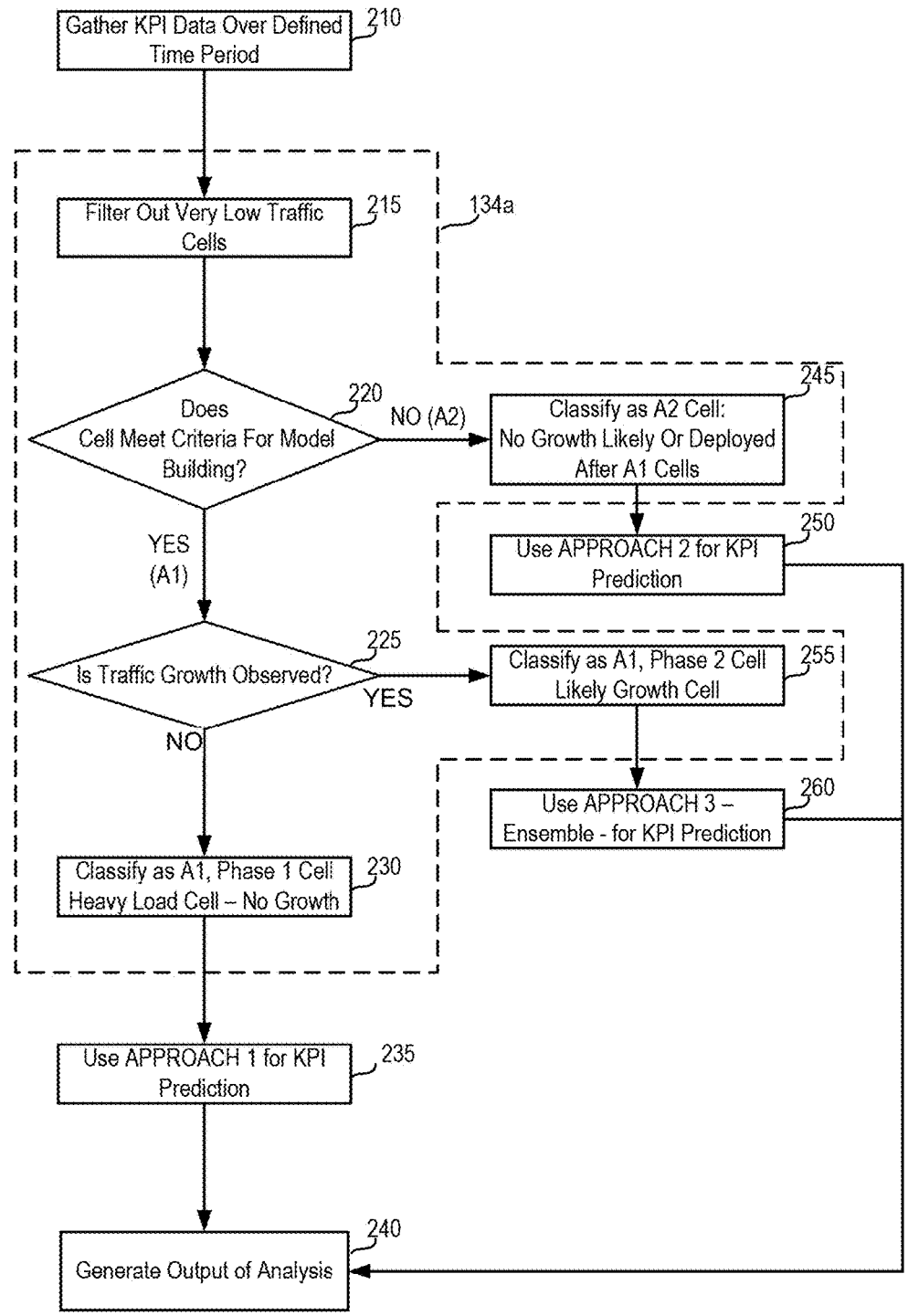
FIG. 2 is a flowchart illustrating a method for predicting key performance indicators based on cell classification in a cellular network in accordance with the present disclosure.

FIG. 2 is a flowchart illustrating a method in accordance with the present disclosure. Although the method will be described with respect to KPIs, it will be recognized that the method may be equally to other forms of performance indicator data such as KQIs for a cellular or other network. The method of FIG. 2 illustrates an overall method of analysis that generates an output—such as an alarm for a network administrator—to allow proactive management of a cellular network. The alarm may be generated when a prediction of a future value of a KPI exceeds an alarm threshold value. The method of FIG. 2 may be repeated at intervals selected by the network administrator or a service provider operating the network monitoring system 195 as a service for one or more cellular network providers or administrators. In either case, a set of KPI data over a time period is retrieved from the cellular network for which the analysis is performed, and the analysis of FIG. 2 performed to provide a future prediction of KPI values which may alert the administrator to potential issues with the network. The method can then be repeated as needed.

At 210, KPI data over a defined period is gathered. KPI data at step 210 may be observed network data 115 illustrated in FIG. 1. The network data 115 may be gathered over a period of time suitable to provide enough data to accomplish the calculations and predictions described herein. One example of a time period suitable to provide enough data to accomplish the calculations and predictions described herein is a two-month time period. The observed network data 115 may be subdivided as described herein into training data, testing data and validation data. For example, in a dataset of observed network data 115 comprising two months of observed KPI data, four (4) weeks of the data may be utilized for training the algorithms discussed herein ("training data"), two (2) weeks of observed data may be used for future KPI prediction ("testing data"), and two (2) weeks of data ("validation data") may be used to determine the errors in KPI predictions.

After observed KPI data is retrieved at 210, the disclosure classifies the data based on the cell from which the data originated. As used herein, in one context, the terms cells may refer to the observed data in the observed data 115 associated with a particular cell in the cellular network 100.

Steps 215, 220, 225, 230, 245 and 255 are shown as grouped as classifier steps 134a, and represent functions which may be performed by classifier 134. At 215, data from cells with an extremely light load is filtered out. For extremely light traffic loading cells, there is generally no need to predict the KPI as such cells are not in growth mode or in danger of adversely affecting a user's experience. Generally, such cells have not reached resource or capacity constraints. In one embodiment a very low traffic load threshold is first defined using an identified traffic related indicator (KPI) and the threshold used to determine the extremely light traffic loading cells at 215. One example for determining an extremely light traffic cell is to use a threshold for a cell where more than 10% of cell observations having "L.Traffic.ActiveUser.DL.QCI.Total" (the average number of active downlink users across all the QCI's) smaller than 0.1. This threshold can usually be determined based on engineering knowledge or set by the administrator or operator of the network monitoring system 195.

The cell data remaining after filtering step 215 belongs to non-light traffic load cells. Such cells experience what may be characterized as a medium to heavy load traffic condition, and will be used to predict future KPI changes in cells likely to experience growth or resource constraints and thus adversely affect the user experience. As discussed below, data from these remaining cells is further classified into medium traffic load cells and heavy traffic load cells. The heavy traffic load cell data is used to train the prediction models as such cells are more likely to experience performance issues. The cells with relatively lower traffic load (medium traffic load cells) are not used to train prediction models as their performance is likely to be acceptable given the current analysis. Later the trained models built using heavy traffic loading cells would be used to predict the KPIs of the relatively lower traffic loading cells.

At step 220, a first determination is made as to whether or not a cell meets a criterion for predictive model building. At 220, the criterion for model building may be those cells which have a heavy (as opposed to medium) traffic load during busy periods of the cellular network 100. Those cells that are heavy traffic load cells are those that may be characterized as having a KPI above a certain threshold, for example 85% capacity of a measurable traffic-indicating KPI, during peak using periods. At 220, those cells that do not meet the heavy load criteria for model building will be those cells with a relatively lower traffic load (medium traffic) compared to heavy traffic load cells, as well as those cells which may be deployed in the network 100 after deployment of heavy traffic load cells. At 245, those cells not meeting the heavy load criterion are referred to as "A2" cells. Such cells are less likely to see faster traffic growth compared to cells with heavy traffic load.

High traffic cells will be classified as "A1" cells, and further classified into growth and non-growth cells at steps 225, 230 and 255. At 225, a determination is made as to whether high-traffic A1 cells are likely to observe traffic growth. If not, at 230, the A1 cells are further classified as A1, Phase 1 (A1P1) cells as cells not likely to have growth. If a cell is likely to see growth, then at 255 the cell is classified as an A1, Phase 2 (A1P2) cell.

At 225, conditions for determining traffic growing (at cell level) include whether more than G % (where G in one example is 35%) of testing observations are "out of feature range." In this case, "out of feature range" means that at least one KPI feature's value in observed data is larger than, for example, the 95th percentile value of a training data set. For example, a testing observations' average "L.Thrp.bits.DL" is larger than training observations' 95th percentile value of "L.Thrp.bits.DL".

Depending on classification, one of three different predictive approaches is used for KPI prediction on the basis of the observed network data for the cell.

Steps 235, 250, 260 represent functions which may be performed by the KPI analyzer 135 of FIG. 1. For A2 (medium traffic or later deployed) classified cells, at 250, a prediction approach referred to herein as Approach 2 is utilized. For A1P1 (heavy traffic, no growth) cells, at 235, a prediction approach referred to herein as Approach 1 is utilized. For A1P2 (heavy traffic, growth) cells, at 255, an prediction approach referred to herein as Approach 3, sometimes referred to herein as an ensemble approach, is utilized.

After each of the approaches—Approach 1, Approach 2, or Approach 3 are utilized—an output of the prediction analysis can be provided at 240. Each of the respective approaches—Approach 1, Approach 2, or Approach 3—is discussed in further detail below. Each of the respective approaches may be performed by the KPI analyzer 135 of FIG. 1. The output may take the form of a display on a display output device 150 or any other form of suitable output such as an electronic report, which may be provided to the cellular network operator. The output may be, for example, a full report of the future values of performance indicators such as KPIs and KQIs considered by the predictive system herein, or an alarm for a specific KPI or KQI when one or more of the predicted future values of a performance indicator exceeds an alarm threshold. Each of the calculations in the respective approaches discussed herein may be alternatively referred to as a predictive model or a predictive calculation, the result of which is a future value of a performance indicator such as a KPI or a KQI.

Figure 3:
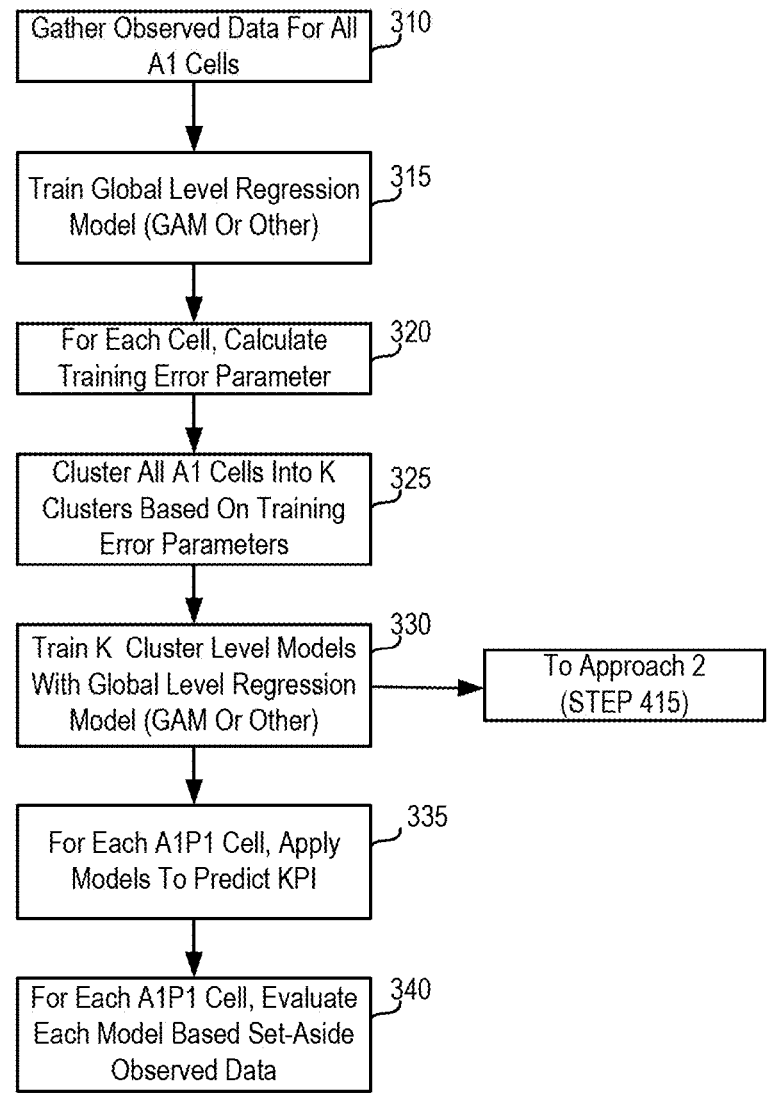
FIG. 3 is a flowchart illustrating a first approach to predicting KPI for a first classification of cell in the cellular network.

FIG. 3 is a flowchart illustrating Approach 1 discussed above with respect to step 250 of FIG. 2 to predict future values of performance indicators. At 310, training data for all A1 (high traffic load) classified cells is retrieved. As noted above, training data will comprise a subset of observed data in a data set 115 for the network 110 over a particular time period. In one example, the time period is 2 months. In such an example, the training data may for example comprise first month of observed data for the cellular network 100. At 315, a predictive model comprising a global level regression model is trained based on the training data in the observed data 115 from step 310. As known, the global level regression analyses may be used to characterize how the value of some dependent variable changes as one or more independent variables is varied. In one embodiment, the regression algorithm used in predicting the identified network KPI dependent variable is a Generalized Additive Model (GAM). In one embodiment, the dependent variable utilized is: PS.Service.Downlink.Average.Throughput (the average downlink service traffic throughput at cell level), and the independent variables are: L.Traffic.ActiveUser.DL.QCI-.Total (the number of activated user equipment from QCI (QoS Class Identifier) 1 to QCI 9 in the downlink buffer in a cell); L.Thrp.bits.DL (the total downlink traffic volume for PDCP SDUs in a cell) and L.Thrp.bits.UL (the total uplink traffic volume for PDCP PDUs in a cell).

Next, 320, for each cell, the training error parameters of each cell are calculated. The training error may be calculated by any of a goodness of fit value (or coefficient of determination) such as $R^2$, a prediction error such as the root mean squared error (RMSE), percent mean absolute deviation (PMAD) and mean absolute percentage error (MAPE).

At 325, all A1 cells are clustered into K clusters based on their training error parameters. For example, k-means clustering partitions observations (in this case the training error parameters) into k clusters in which each observation belongs to the cluster with the nearest mean, serving as a prototype of the cluster.

At 330, K cluster level regression predictive models are trained, one for each k-th cluster determined in step 325. These cluster level regression models are used in both Approach 1, and Approach 2 as well, as discussed below.

At 335, for each A1P1 cell, test data for the A1P1 cell is used as input for the k-th model of the cluster to which the cell belongs to predict KPIs for the cell. At 340, for each A1P1 cell, the model used for the cell is evaluated against the validation of data from the original observed data set.

Although A1P1 cells already exhibit high traffic load, an output of the analysis of Approach 1 can indicate potential forthcoming problems with A1P1 cells going forward. As noted, a report on these predictions in future KPIs is output at 240 of FIG. 2.

Figure 4:
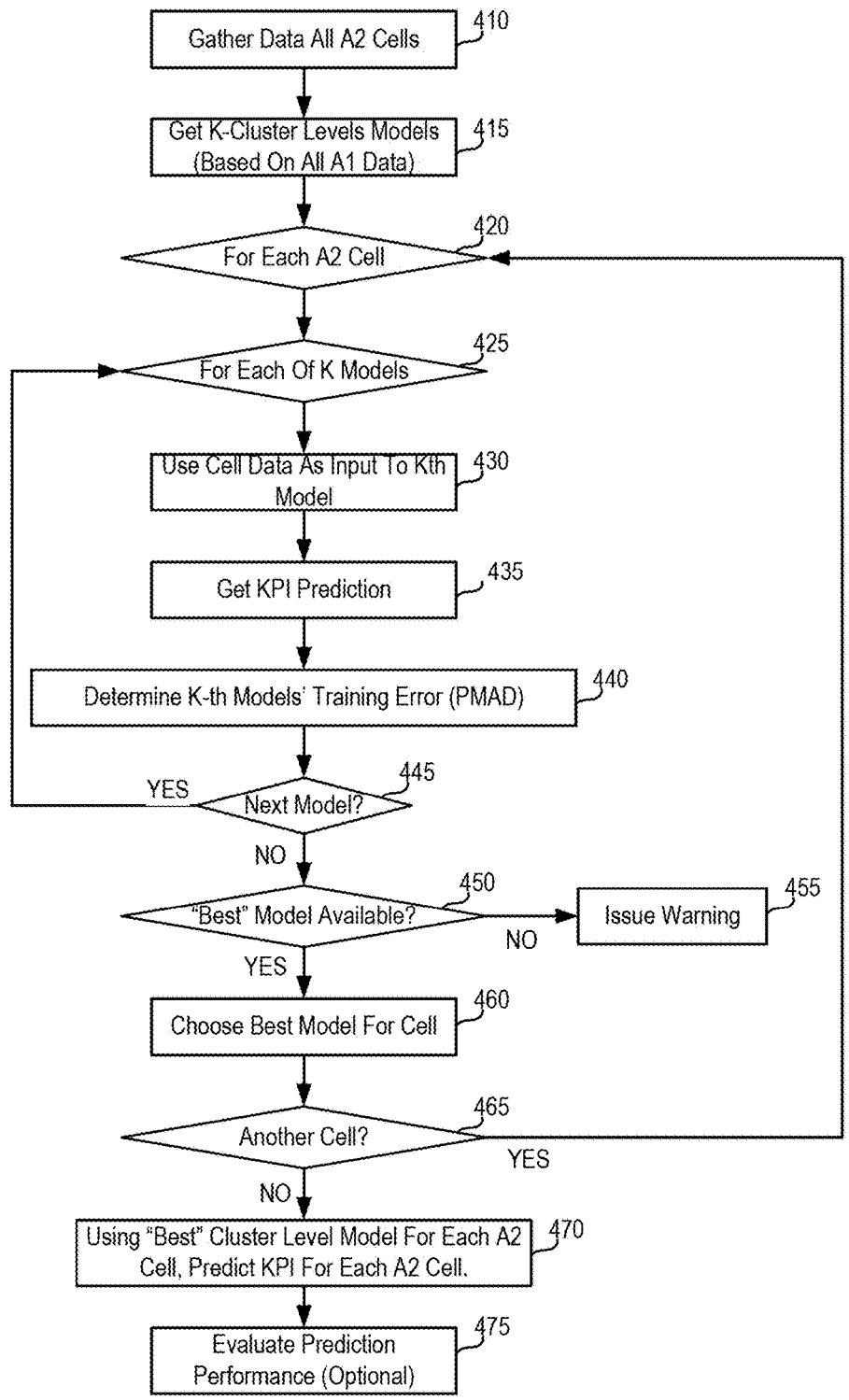
FIG. 4 is a flowchart illustrating a second approach for predicting KPI for a second classification of cells in the cellular network.

FIG. 4 is a flowchart illustrating a method for performing Approach 2 discussed above with respect to FIG. 2 to predict future values of performance indicators. At 410, data from all A2 (medium traffic) cells in the observed data 115 is retrieved. The K cluster level (predictive) models created in Approach 1 of FIG. 3 are retrieved at 415. At 420, for each A2 cells data, and at 425 for each of the K models, A2 cell data is used as input to each of the k-th model to calculate a KPI prediction at 435 for each such cell.

At 440, the k-th models training error is determined. Again, the error may be a goodness of fit value (or coefficient of determination) such as $R^2$, a prediction error such as the root mean squared error (RMSE), percent mean absolute deviation (PMAD) and mean absolute percentage error (MAPE) for each of the K regression models.

At 445, if a next model is present for the A2 cell under consideration (at 420), the method returns step 425 and repeat steps 430 through 440 until all models of the K number of models have been calculated for each cell. If no additional models are to be considered at 445, then a determination is made at 450 as to whether or not a best model can be chosen.

At 450, if the prediction errors from all of the K regression model models are larger than a predefined threshold, then it is determined that no suitable model can be selected for the cell and a warning is issued at 455. The prediction results for the cell will be flagged with a warning indicator at 455. The predefined threshold can be defined as based on the measure used in predicting the prediction error. In one embodiment, where the prediction error is calculated by PMAD, a 30% threshold may be used. If at 450 one or more prediction errors are below the threshold, then for each cell, the regression model with the lowest prediction error (using the PMAD example) for the training observation is selected as the best model at 460. The threshold may be configurable by the cellular network provider or network monitoring system administrator.

If another cell is to be calculated at 465, then the method returns to step 420 to repeat the calculations (425-460) for the next cell. Once all cells of are completed 465, then using the "best" cluster level model for each cell, the KPI is predicted for each such A2 cell at 470 based on the testing data available in the observed data.

At 475, optionally, the prediction performance evaluation for A2 cells can be evaluated using the validation data in the observed data for the same A2 cells.

As noted above, Approach 3 uses three different algorithms to perform KPI prediction for A1P2 (high load, growth) cells.

Figure 5:
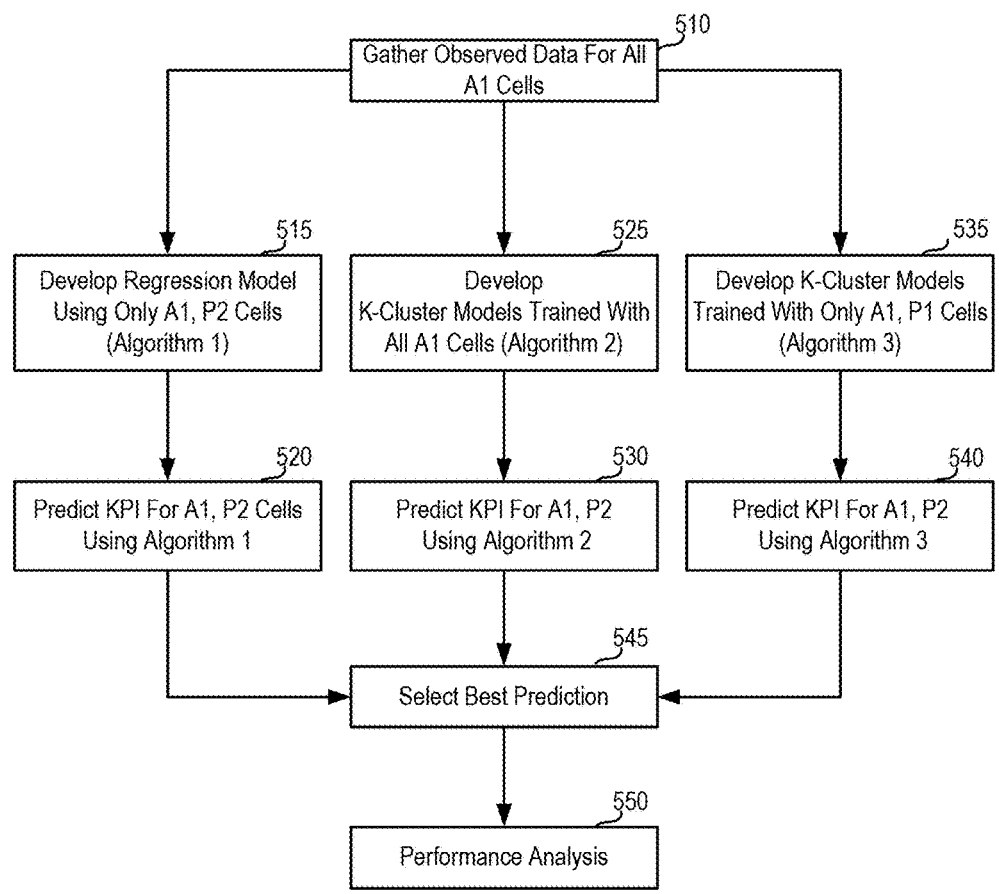
FIG. 5 is a flowchart illustrating a third, ensemble approach for predicting KPI for a third classification of cells in the cellular network.

FIG. 5 illustrates an embodiment of the present disclosure for performing Approach 3 used for predicting future values of KPIs for high load cells where traffic is likely to increase over time. In Approach 3, in one embodiment, multiple algorithms are used for prediction, and the algorithms are integrated together to form a multiple-algorithm ensemble. This provides a robust multiple algorithm prediction and improves the accuracy of KPI predictions for cellular network operators.

At 510, observed network performance data 115 for A1 cells is gathered at 510. Again, the network data 115 includes training data, testing data, and validation data.

At 515 an auto-regressive predictive model is developed based on the training data for the A1P2 cells. The auto-regressive model is sometimes referred to herein as Algorithm1. An auto-regressive algorithm may be performed by any number of auto-regressive techniques including, for example, vector auto-regressive mode, auto-regressive moving average model, and other auto-regressive models. At 520, future values of performance indictors KPIs for each of the A1P2 cells are predicted at 520 based on the trained models using A1P2 testing data as input to the auto-regressive model.

Table 1 is an example of Algorithm 1's prediction performance in terms of a calculated performance error on a real-world data set of observed data 115 for a cellular network:

TABLE 1

|  | R2 | RMSE | MAPE | PMAD |
|---|---|---|---|---|
| Algorithm 1 | 0.537818 | 1525.751 | 0.149063 | 0.142817 |

As illustrated in Table 1, in one embodiment, Algorithm 1 provides sufficient accuracy for KPI prediction of A1P2 cell KPI to allow for error correction by a network operator.

At 525, K cluster predictive models are trained with training data for all A1 cells in a manner like that described above with respect to FIGS. 3 and 4. One difference here is that data from all A1 cells (both A1P1 and A1P2 cells) is utilized in training the K cluster models in step 525.

At 530, these cluster models are utilized to predict future values of KPI for A1P2 cells based on A1P2 testing data as input to the models.

At 535, Algorithm 3 begins in a manner similar to step 525, where K cluster predictive models are trained with only A1P1 cell data. At 540, future values of performance indictor KPIs are predicted for A1P2 data using the K cluster models trained with the A1P1 cell data from step 535 based on the trained models using A1P2 testing data as input to the models.

At 545, the "best" prediction is selected. A method for selecting the "best" prediction is disclosed with respect to FIG. 6. Optionally, at 550, the analysis of the prediction can be validated using the validation data of each of the respective algorithms.

FIG. 6 illustrates an ensemble method of determining the best prediction. For each A1P2 cell at 610, a comparison of the KPI prediction results from Algorithms 1-3 against the respective validation data for the observed input KPI data of each Algorithm is made at 615. At 620, the prediction error for each Algorithm is calculated with the cross validation data at 620. At step 620, there may more than one validation observation for the same time interval in the validation data set. In one embodiment, at 620 the average prediction value (across multiple prediction results if applicable) for each method is calculated and the average actual value (across multiple observations if applicable) in the validation data set is calculated. These average values are then compared to determine the predication error at 620. If, however, there is only one validation data set observation of a KPI (for the same interval) then the computation of average values at this step is not needed, and the single predicted KPI and observed KPI are compared.

From the prediction error and cross-validation at steps 615 and 620, two cases will result:

At 625, if after cross-validation at 620, all three Algorithms' overall predictions are higher than the overall actual value(s) of the KPI for observed (from the cross-validation data), or if all three Algorithms' overall KPI predictions are lower than the actual value(s) of the KPI, then at 630, the "best" result is chosen as the prediction result from the Algorithm with the smallest cross-validation error (in terms of for example, PMAD as calculated in step 620) as the ensemble prediction result, and the method returns to 610 to predict the next A1P2 cell.

Returning to step 625, if no all three algorithms predications are all higher or lower than the actual value of the KPI, then at step 635, two of the three Algorithms' overall prediction results are higher than the overall actual value of the KPI from the observed data while one of the Algorithm's overall prediction is lower, or one of the Algorithm's overall prediction is higher while the other two Algorithms' overall prediction are lower. If this is the case, then results from the three Algorithms are fused at 640.

In this context, the "overall predictions" comprise computing whether the single or average prediction result for the identified KPI/KQI is greater/lower than the individual or average values from all 3 methods. If so, then the method moves to step 630 to select the lower prediction error rate to predict the future values for the identified KPI/KQI. If not, (meaning at least one method doesn't agree), then the method moves to steps 635 and 640, calculating weights for all 3 methods using the below formula and generating the final prediction results accordingly.

At 640, the fusing of the three Algorithms' results into an ensemble predictive value which may be calculated in accordance with the following formulas:

$$\text{Predict}_{Ensemble} = \text{Weight}_A \cdot \text{Predict}_A + \text{Weight}_{B1} \cdot \text{Predict}_{B1} + \text{Weight}_{B2} \cdot \text{Predict}_{B2}$$

where $$\text{Weight}_A = \frac{\log \frac{1-PMAD_A}{PMAD_A}}{\log \frac{1-PMAD_A}{PMAD_A} + \log \frac{1-PMAD_{B1}}{PMAD_{B1}} + \log \frac{1-PMAD_{B2}}{PMAD_{B2}}}$$

In the foregoing fusion formula, relatively higher weight is given to the result from the model which was determined to have lower prediction error rate and relatively lower weight is given to the result from the model which was determined to have higher prediction error rate.

It should be recognized that not all three algorithms (Algorithms 1-3) need be used in every embodiment. In one embodiment only one of the three algorithms is used. In another embodiment, any combination of two of the three algorithms are used. In another embodiment, all three are used and in a still further embodiment, more than three algorithms are used.

Each of the calculations in the respective algorithms discussed herein may be alternatively referred to as a predictive model or a predictive calculation as such algorithms represent the calculations that result in a future value of a performance indicator such as a Key Performance indicator or a Key Quality Indicator. These future values represent prediction results which are fused in Approach 3.

Table 2 below illustrates the prediction performance example of ensemble Algorithm 1 and Algorithm 2 using the same sample data from a cellular network as that illustrated in Table 1. Table 3 shows the prediction performance example of ensemble all 3 Algorithms.

Comparing tables 2 and 3, along with Table 1 above, the two-Algorithm ensemble proves to have better prediction performance than using individual Algorithm1 alone, and the three-Algorithm ensemble further improves the prediction performance on top of two-Algorithm ensemble.

TABLE 2 an example of the prediction performance of ensemble algorithm 1 and algorithm 2

| | R2 | RMSE | MAPE | PMAD |
|---|---|---|---|---|
| Algorithm 1 | 0.537818 | 1525.751 | 0.149063 | 0.142817 |
| Algorithm 2 | 0.523446 | 1549.291 | 0.177752 | 0.160132 |
| 2-Algorithm ensemble | 0.597328 | 1424.140 | 0.137205 | 0.131301 |
| Average Improvement | 12.6% | 7.4% | 15.4% | 13.1% |

TABLE 3 an example of the performance of ensemble all 3 algorithms

| | R2 | RMSE | MAPE | PMAD |
|---|---|---|---|---|
| Algorithm 1 | 0.537818 | 1525.751 | 0.149063 | 0.142817 |
| Algorithm 2 | 0.523446 | 1549.291 | 0.177752 | 0.160132 |
| Algorithm 3 | 0.569067 | 1473.269 | 0.169827 | 0.152629 |
| 3-Algorithm ensemble | 0.636483 | 1353.129 | 0.135384 | 0.128654 |
| Average Improvement | 17.2% | 10.7% | 17.7% | 15.1% |

Using the three-algorithm ensemble, the average improvement in $R^2$ is 17.2% and the improvement in percent of mean absolute deviation (PMAD) is 15.1%

It will be recognized that numerous alternative forms of output may be provided. In one alternative, a user interface may provide an alert of one or more quality or performance indicators experiencing an anomaly, with the interface providing a facility to provide further information on the root cause (or potential root causes ordered confidence or lift).

Memories described herein are tangible storage mediums that can store data and executable instructions, and are non-transitory during the time instructions are stored therein. A memory described herein is an article of manufacture and/or machine component. Memories as described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. Such computer readable media specifically excludes signals. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The subject matter herein advantageously provides a processor implemented method of: accessing a set of observed performance indicator data, the performance indicator data comprising a time sequenced measure of performance indicators for the cellular network; classifying the observed performance data based on a cell from which the data originated, the classifying including classifying the cell as one of a high load growth cell and a high load non-growth cell; based on the classifying, computing a future value of at least one performance indicator using a predictive model based on testing data for the cell in the observed performance indicator data, the predictive model derived from training data in the observed performance indicator data; and outputting an indication of the future value of the at least one of the performance indicators when the future value exceeds an alarm value.

In one aspect, the disclosure includes a method of operating a cellular network where the network operator observes network data over a time period, and performs the processor implemented method to determine issues with the network. The network operator then takes corrective action on the network by, for example, adding new base stations to the network to address potential issues.

In one aspect, the disclosure includes a method of providing information to the operator of a cellular network by a service provider. The method includes receiving, observing or otherwise acquiring network data over a time period, and includes preforming the processor implemented method to determine issues with the network. Information can then be provided to the network operator so that the operator then takes corrective action on the network by, for example, adding new base stations to the network to address potential issues.

In accordance with the disclosure, multiple approaches are designed for network performance indicator prediction, and different conditions (based on load) for the cells are defined to best utilize the strength in different approaches to specifically target each cell condition. In an ensemble approach, more than one predictive model is trained based on different testing data for the prediction of high load growth cells and the results of the predictions are integrated to form a multiple-algorithm ensemble. This improves the prediction power comparing to algorithms either using past values alone or using other independent variables to predict network performance indicators The disclosure provides an improvement in the efficiency with which cellular networks can be operated, thereby providing improved service to network customers since network operators can predict future network issues and address them prior to network failure or further performance degradation.

The disclosure described herein may be further implemented in an automated method of operating a cellular network. A network or system administrator may monitor any of the key performance or quality indicators described herein and gather performance data for the network. The administrator may then apply the methods disclosed herein or use the cellular network monitoring system to generate a report which can predict future values of the key quality and performance indicators and based on the report, the administrator may take proactive actions on the network in order to maintain the network in peak operating condition.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for predicting cellular network performance based on observed performance indicator data from cells in the cellular network, comprising:
    accessing a set of observed performance indicator data, the observed performance indicator data comprising performance indicators for the cellular network measured in a time sequence;
    classifying a cell based on the observed performance data, the classifying including classifying the cell as a high load growth cell or a high load non-growth cell;
    based on the classifying, computing a future value of at least one of the performance indicators using a predictive model based on testing data for the cell, wherein the predictive model is derived from training data in the observed performance indicator data; and
    outputting the future value of the at least one of the performance indicators.

2. The method of claim 1, wherein the set of observed performance indicator data comprises performance indicator data for a time period, and the computing comprises computing an ensemble predictive model combining future values from computing at least two predictive models for the high load growth cells.

3. The method of claim 2, wherein the at least two predictive models comprises a first predictive model and a second predictive model, and each the first predictive model and the second predictive model are based on training data from a different one of high load growth cells, all high load cells and high load non-growth cells.

4. The method of claim 2, wherein the at least two predictive models comprises a first predictive model, a second predictive model, and a third predictive model, each model predicting high load growth cell future values for at least one performance indicator, and wherein
    the first predictive model is based on training data from high load growth cells and the computing future values using the ensemble predictive model comprises computing the first predictive model with testing data from high load growth cells;
    the second predictive model is based on the training data from all high load cells and the computing using the ensemble predictive model further comprises computing the second predictive model with the testing data from high load growth cells; and
    the third predictive model is based on training data from all high load non-growth cells and the computing using the ensemble predictive model further comprises computing the predictive model with the testing data from high load growth cells.

5. The method of claim 4, wherein the first predictive model comprises an auto-regressive model.

6. The method of claim 4, wherein the second and third predictive models comprise k-cluster models.

7. The method of claim 4, wherein the set of performance indicator data further includes validation data, and the method further comprises determining future values for said outputting by:
    comparing predicted future values of the at least one performance indicator calculated by each of the first predictive model, the second predictive model and the third predictive model to at least one actual value of the at least one performance indicator in the validation data, and
    if all predicted future values are higher or lower than the at least one actual value, selecting a predicted future value by the predictive model having the smallest error relative to the validation data; or
    if not all predicted future values are higher or lower than the at least one actual value, then fusing the predicted future values of each of the first predictive model, the second predictive model and the third predictive model into an ensemble predictive value by weighting an error of each model relative to the at least one actual value of the performance indicator.

8. The method of claim 7, wherein the at least one actual value of the at least one performance indicator comprises a plurality of actual values of the at least one performance indicator, and wherein the predicted future values comprise a plurality of future values of the at least one performance indicator by each of the first predictive model, the second predictive model and the third predictive model, and the comparing comprises averaging the plurality of actual values and averaging each of the plurality of future values predicted by the first predictive model, the second predictive model and the third predictive model, and
    said comparing comprises comparing an average value of the plurality of the at least one performance indicator and an average value of each of each of the first predictive model, the second predictive model and the third predictive model.

9. The method of claim 7, wherein said fusing comprises calculating the ensemble predictive value by assigning a relatively higher weight to a predictive future value from the predictive model which was determined to have lower prediction error rate and a relatively lower weight to a predicted future value from the predictive model which was determined to have higher prediction error rate.

10. The method of claim 1, wherein the classifying further includes classifying cells in the data into medium load cells, and the computing a future value of at least one performance indicator includes using a predictive model based on training data from high load growth cells in the observed performance indicator data, the predictive model calculated using testing data from the medium load cells.

11. A cellular network monitoring system, that when executed by one or more processors, cause the one or more processors to perform the steps of:
   accessing a set of observed performance indicator data, the performance indicator data comprising performance indicators for a cellular network measured in a time sequence;
   computing future values of at least one performance indicator using an ensemble predictive model based on testing data in the set of observed performance indicator data, the training data for cells classified as high load growth cells or high load non-growth cells, the ensemble predictive model derived from training data for at least a portion of cells classified as high load cells in the observed performance indicator data and comprising at least two predictive models for the high load growth cells; and
   outputting a future value of the at least one of the performance indicators.

12. The cellular network monitoring system of claim 11, wherein
   the at least two predictive models comprises a first predictive model, a second predictive model, and a third predictive model, each model predicting future values for at least one performance indicator for a high load growth cell, and wherein
   the first predictive model is based on training data from high load growth cells and the computing future values using the ensemble predictive model comprises computing the first predictive model with testing data from high load growth cells;
   the second predictive model is based the training data from all high load cells and the computing future values using the ensemble predictive model further comprises computing the second predictive model with the testing data from high load growth cells; and
   the third predictive model is based on training data from high load non-growth cells and the computing future values using the ensemble predictive model further comprises computing the third predictive model with the testing data from the high load growth cells.

13. The cellular network monitoring system of claim 12, the set of performance indicator data further includes validation data, and instructions, when executed by one or more processors, cause the one or more processors to determine future values for said outputting by:
   comparing predicted future values of the at least one performance indicator calculated by each of the first predictive model, the second predictive model and the third predictive model to at least one actual value of the at least one performance indicator in the validation data, and
   if all predicted future values are higher or lower than the at least one actual value, selecting a predicted future value from the predictive model having the smallest error relative to the validation data; or
   if not all predicted future values are higher or lower than the at least one actual value, then
   fusing the predicted future values of each of the first predictive model, the second predictive model and the third predictive model into a single ensemble predictive value by weighting an error of each model relative to the at least one actual value of the performance indicator.

14. The cellular network monitoring system of claim 13, wherein the first predictive model comprises an auto-regressive model trained using training data based on high load growth cells in the set of observed performance indicator data;
   wherein the second predictive model comprises a k-cluster model trained using training data based on all high load cells in the set of observed performance indicator data; and
   wherein the third predictive model comprises a k-cluster model trained using training data based on high load non-growth cells in the set of observed performance indicator data.

15. The cellular network monitoring system of claim 13, wherein the at least one actual value of the at least one performance indicator comprises a plurality of actual values of each the at least one performance indicator, and wherein the predicted future values comprise a plurality of future values of the at least one performance indicator by each of the first predictive model, the second predictive model and the third predictive model and the comparing comprises averaging the plurality of actual values and averaging each of the plurality of future values predicted by the first predictive model, the second predictive model and the third predictive model, and
   said comparing comprises comparing said average values.

16. The cellular network monitoring system of claim 13, wherein said fusing comprises calculating the ensemble predictive value by assigning a relatively higher weight to a predictive value result from the model which was determined to have lower prediction error rate and a relatively lower weight is assigned to a predicted value result from the model which was determined to have higher prediction error rate.

17. A cellular network monitoring system, comprising:
   a non-transitory memory storage comprising instructions; and
   one or more processors in communication to the memory, wherein the one or more processors execute the instructions to:
      access a set of observed performance indicator data of performance indicators for the cellular network;
      classify a cell based on the observed performance data including classifying the cell as one of a high load growth cell or a high load non-growth cell;
      compute future values of at least one performance indicator using at least an ensemble predictive model based on testing data for cells classified as high load growth cells based on the observed performance indicator data, the ensemble predictive model derived from training data for at least a portion of cells classified as high load cells in the observed performance indicator data and comprising at least two predictive models for the high load growth cells where each of the at least two predictive models are based on training data from a different one of high load growth cells, all high load cells and high load non-growth cells; and
      output a future value of the at least one of the performance indicators.

18. The cellular network monitoring system of claim 17, wherein the one or more processors execute the instructions to compute a future value of one of the first predictive model and the second predictive model based on a computed error rate of each said predictive model relative to validation data for the performance indicator in the set of observed performance indicator data.

19. The cellular network monitoring system of claim 17, further including a third predictive model, and wherein one or more processors execute the instructions to
- compute future values using the ensemble predictive model using the first predictive model with testing data from high load growth cells, and wherein the first predictive model is based on training data from high load growth cells;
- compute future values using the ensemble predictive model using the second predictive model with testing data from the high load growth cells, and the second predictive model is based on training data from all high load growth cells; and
- compute future values using the ensemble model using the third predictive model, where the third predictive model is based on training data from a high load non-growth cells and wherein the instructions stored on the storage are operable to instruct the at least one processor to the compute future values using the third predictive model with the testing data from the high load growth cells.

20. The cellular network monitoring system of claim 19, wherein one or more processors execute the instructions to select a future value of one of the first predictive model and the second predictive model and the third predictive model based on a computed error rate of each said protective model relative to validation data for the performance indicator in the set of observed performance indicator data by:
- comparing predicted future values of the at least one performance indicator calculated by each of the first predictive model, the second predictive model and the third predictive model to at least one actual value of the at least one performance indicator in the validation data, and
- if all predicted future values are higher or lower than the at least one actual value, selecting a predicted future value from the predictive model having the smallest error relative to the validation data; or
- if not all predicted future values are higher or lower than the at least one actual value, then
- fusing the predicted future values of each of the first predictive model, the second predictive model and the third predictive model into an ensemble predictive value by assigning a relatively higher weight to a predictive value result from the model which was determined to have lower prediction error rate and a relatively lower weight is assigned to a predicted value result from the model which was determined to have higher prediction error rate.

* * * * *